Dec. 30, 1924. 1,521,343
G. H. TOWNSEND
TEMPERATURE RESPONSIVE INSTRUMENT
Filed Dec. 29, 1919
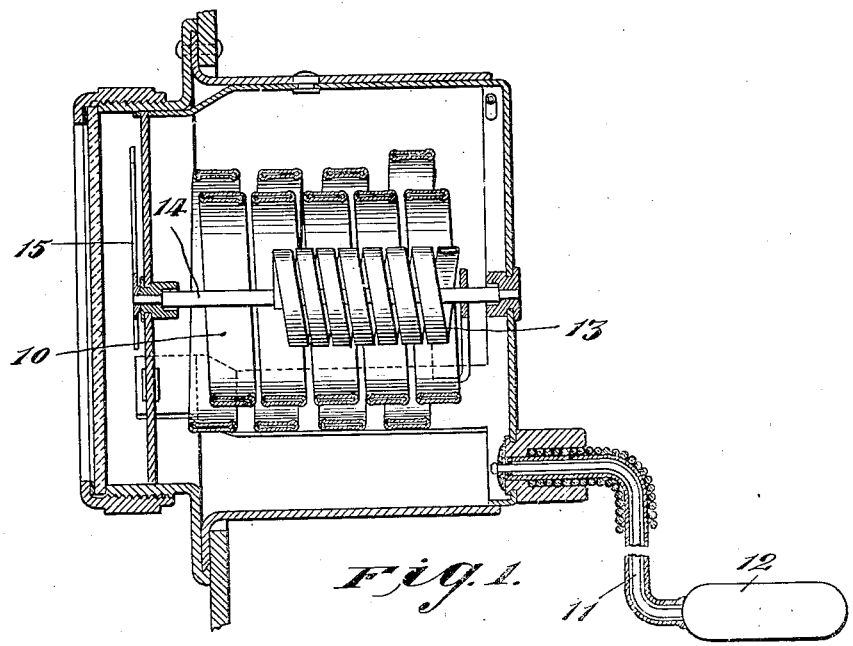
Fig. 1.
Fig. 2.
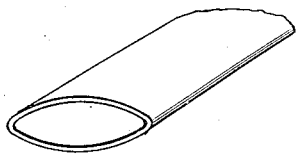
Fig. 3.
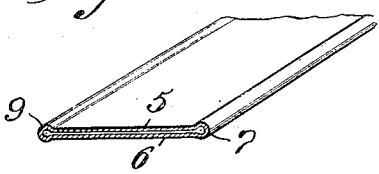
Fig. 4.
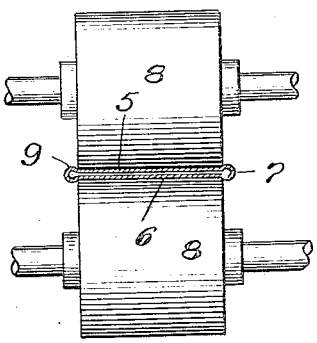
INVENTOR
George H. Townsend
BY
Edmund Livery Reeves ATTORNEYS Patented Dec. 30, 1924.

1,521,343

UNITED STATES PATENT OFFICE.

GEORGE H. TOWNSEND, OF BRONXVILLE, NEW YORK.

TEMPERATURE-RESPONSIVE INSTRUMENT.

Application filed December 29, 1919. Serial No. 348,231.

*To all whom it may concern:*

Be it known that I, GEORGE H. TOWNSEND, a citizen of the United States, residing in Bronxville, Westchester County, and State of New York, have invented certain new and useful Improvements in Temperature-Responsive Instruments, of which the following is a specification.

In certain kinds of pressure sensitive devices, such as pressure gages, thermometers of what are known as the "distance type" and similar instruments, curved flattened tubes known as Bourdon tubes or springs are employed which are sensitive to changes in pressure, and serve to actuate the indicating devices of the instrument. In many such instruments, particularly in thermometers, it is desirable to have the capacity of the Bourdon tube or spring as small as possible, as this tends to reduce errors due to such causes as variations in the local temperature affecting directly the Bourdon tube and its contents. In order to shape the Bourdon tube so that it will perform its function, and so that it will contain as small a quantity of the expansible fluid or liquid as possible, it has been the practice to roll the tubing practically flat. I have found, however, that this procedure is subject to the objection that the flattened tubing is likely to be weakened at the edges owing to the sharpness of the bends in the metal, considerable difficulty being experienced from such flat rolled tubes cracking along the edges. This difficulty I have discovered can be obviated by rolling the tubing flat throughout the greater part of its width and almost up to the edges, leaving the extreme edge portions, however, unflattened so that the edges of the tube are left somewhat curved instead of being sharply bent. Not only does this avoid the weakening of the tube at the edges, but I have found that tubing formed in this way will actually contain less fluid than tubing rolled between rollers for its entire width. This is probably due to the fact that the flattened parts of the walls of the tubing prepared in accordance with my invention will remain closer together when filled with fluid and when subjected to internal pressure, than will the walls of tubing which has been uniformly rolled throughout its width, but whatever the cause, tests which I have made have shown the above condition to be true. My improved tubing is, therefore, especially applicable to the manufacture of thermometers and similar instruments where it is desired to keep the quantity of fluid as small as possible. The tubing also possesses superior qualities of resiliency which make for greater accuracy and durability in any instrument in which it is used.

In the accompanying drawing which forms a part of this specification, Figure 1 is a sectional view of a distance type thermometer illustrative of one type of instrument in which my improved tubing may be advantageously employed.

Figure 2 is a perspective view on an enlarged scale of a section of tubing in the form in which it is usually obtained prior to the flattening operation;

Figure 3 is a similar view showing one form of my improved tubing after flattening in accordance with my method;

Figure 4 is a diagrammatic view showing one form of apparatus by which my improved tubing may be produced.

Referring to the drawings in detail, a thin walled tube of copper or other suitable metal is first prepared in any well known manner, it usually being reduced to a partially flattened or oval form as shown in Figure 2. The tubing is then compressed or flattened out throughout its width, except at the extreme edges so that it is reduced to substantially the form shown in Figure 3 having the intermediate wall portions 5 and 6 brought as closely together as possible. At the extreme edges, however, the tube is not compressed but forms curved ribs or bends 7, thereby giving the tubing what may be described as bulbous curved edges and avoiding sharp angular bends at the edges of the tubing, as would occur if the tubing were flattened throughout its entire width. The tubing thus formed has externally the appearance of a ribbon with thickened edges or marginal parts which are substantially circular in cross section and have a diameter greater than the distance between the flattened sides. Figure 4 shows how the tubing may be produced by means of roller 8, the faces of which are of slightly less width than the width of the tubing when flattened out. In this respect the rolls differ from the flattening rolls heretofore employed which have been of greater width than the tubing so as to roll the same flat throughout the width thereof.

Figure 1 shows the application of the improved tubing in a thermometer in which a double helical coil of the tubing is shown at 10, one end of the coil being connected by means of a capillary tube 11 with a bulb 12, this connection being effected in the manner specifically described in the co-pending application of Herman Schlaich, Serial No. 293,265, filed April 28th, 1919, for instrument construction. The coil 10, tube 11 and bulb 12 are filled with an expansible liquid so that changes of temperature at the bulb, causing the liquid therein to expand more or less, act through the column of liquid in the tube 11 to cause the coil 10 to wind or unwind as the temperature falls or rises. The motion of the coil is transmitted through the compensating coil 13 to an arbor 14 which carries the index hand 15. As the temperatures to which the coil 10 are directly subjected may differ from temperatures affecting the bulb 12, errors may occur and these errors will be greater in proportion to the amount of the expansible liquid contained within the coil. It is therefore important to keep the capacity of this coil as small as possible, this being accomplished by reducing the cross sectional area of the tubing of which the coil is made. As above stated, my improved tubing may be made to have an exceedingly small cross sectional area so that it is especially applicable to an instrument of the character described.

While I have illustrated and described in detail a certain embodiment and application of my invention, it will be understood that changes may be made therein, and that the tubing may be used in any type of instrument where it is found desirable. I desire, therefore, to cover my invention broadly in whatever form its principle may be made use of.

Having thus described my invention, I claim:—

A temperature responsive instrument including a Bourdon coil formed of tubing having its opposite sides flattened and in close proximity throughout the intermediate parts thereof, the marginal parts being substantially circular in cross secton and of a diameter greater than the distance between the flattened parts.

GEORGE H. TOWNSEND.